(12) United States Patent
Chang et al.

(10) Patent No.: US 6,478,466 B1
(45) Date of Patent: Nov. 12, 2002

(54) SLIDING MECHANISM

(75) Inventors: Sung-Po Chang, Taipei (TW); Chang-I Cheng, Taipei (TW)

(73) Assignee: Inventec Appliances Corp., Taipei (TW)

( * ) Notice: Subject to any disclaimer, the term of this patent is extended or adjusted under 35 U.S.C. 154(b) by 60 days.

(21) Appl. No.: 09/715,186

(22) Filed: Nov. 20, 2000

(51) Int. Cl.7 .......................... F16C 29/04; A47B 88/12
(52) U.S. Cl. ..................... 384/49; 384/18; 312/334.17
(58) Field of Search .................. 384/18, 49; 312/334.7, 312/334.17, 334.38

(56) References Cited

U.S. PATENT DOCUMENTS

| | | | | |
|---|---|---|---|---|
| 1,963,956 A | * | 6/1934 | Craig | 384/49 |
| 2,250,895 A | * | 7/1941 | Premo | 384/18 |
| 2,267,043 A | * | 12/1941 | Premo | 384/18 |

* cited by examiner

Primary Examiner—Thomas R. Hannon
(74) Attorney, Agent, or Firm—Birch, Stewart, Kolasch & Birch, LLP

(57) ABSTRACT

A sliding mechanism comprises a sleeve member, two balls in the sleeve member, and an elastic member biased between the balls for urging each ball to project above either opening of the sleeve member. When the sliding mechanism is mounted on a second member, a reduction of friction and a permanent contact between the first and second members are effected because the second member is slidable with respect to a first member with balls being in elastic contact with the first member. This may reduce friction and maintain a permanent contact when first and second members are relatively moving.

6 Claims, 5 Drawing Sheets

SLIDING MECHANISM

BACKGROUND OF THE INVENTION

1. Field of Invention

The present invention relates to an auxiliary sliding device and more particularly to an elastic sliding mechanism mounted on one member for reducing friction with the other member and maintaining a permanent contact when two members are relatively moving.

2. Related Art

A variety of improved and even novel products are commercially available everyday. For example in the field of computer industry, a motherboard is threadedly secured to the casing of a computer in a conventional technique. As such, a person has to unscrew a plurality of screws in order to remove motherboard from computer when a repair or component replacement of motherboard is necessary. It is a tedious job. An improvement has been disclosed wherein motherboard is releasably secured to a mounting plate. A plurality of parallel rails are provided on mounting plate. Correspondingly, a plurality of parallel grooves are provided on the casing of computer. Thus, mounting plate may be slidably secured to the casing of computer. With this, a person may simply directly pull mounting plate out of computer when a repair or component replacement of motherboard is necessary. This facilitates the assembly/disassembly of computer. Following is a description of a similar problem occurred on a notebook computer. Notebook computer comprises a computer body with a keyboard fixed thereon and a display pivotably secured to computer body. Such fixed keyboard is not convenient in operation. As such, an improvement has been disclosed wherein keyboard is slidably secured to computer body. That is, keyboard is received in computer body when not in use, while being pulled out of computer body when in use. This fulfils most needs.

Above two examples are effected through sliding means. The sliding means is typically movable within a predetermined range or effected by a rail-and-groove technique. In the later, the rail (on one member) and groove (on the other member) configuration is disadvantageous for being large in friction and wear loss because rail is directly slid on the groove. It is also known that many members are made of plastic material. As such, wear or deformation may occur on rails and/or grooves after a limited period of time of use. In addition, noise or not so smooth operation may occur when worn or deformed rails are slid on worn or deformed grooves.

Moreover, keyboard and computer are required to be electrically connected when above sliding keyboard is mounted on notebook computer. Conventionally, a conductive metal contact is provided on groove of motherboard so as to form an electrical connection between keyboard and computer by engaging conductive metal contact with metal rail of keyboard. However, such electrical connection is not secured after a limited period of time of use. Likewise, this is caused by the worn or deformed rails and/or grooves.

Thus, it is desirable to provide an improved sliding mechanism in order to overcome the above drawbacks of prior art.

SUMMARY OF THE INVENTION

It is therefore an object of the present invention to provide an elastic sliding mechanism mounted on one member for reducing friction with the other member and maintaining a permanent contact when two members are relatively moving.

The advantages of the present invention are realized by providing a sliding mechanism comprising a sleeve member, two balls in the sleeve member, and an elastic member biased between the balls for urging each ball to project above either opening of the sleeve member. When the sliding mechanism is mounted on a second member, a reduction of friction and a permanent contact between the first and a second members are effected because the second member is slidable with respect to the first member with balls being in elastic contact with the first member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinbelow illustration only, and thus are not limitative of the present invention, and wherein.

DETAILED DESCRIPTION OF THE INVENTION

Figure 1:
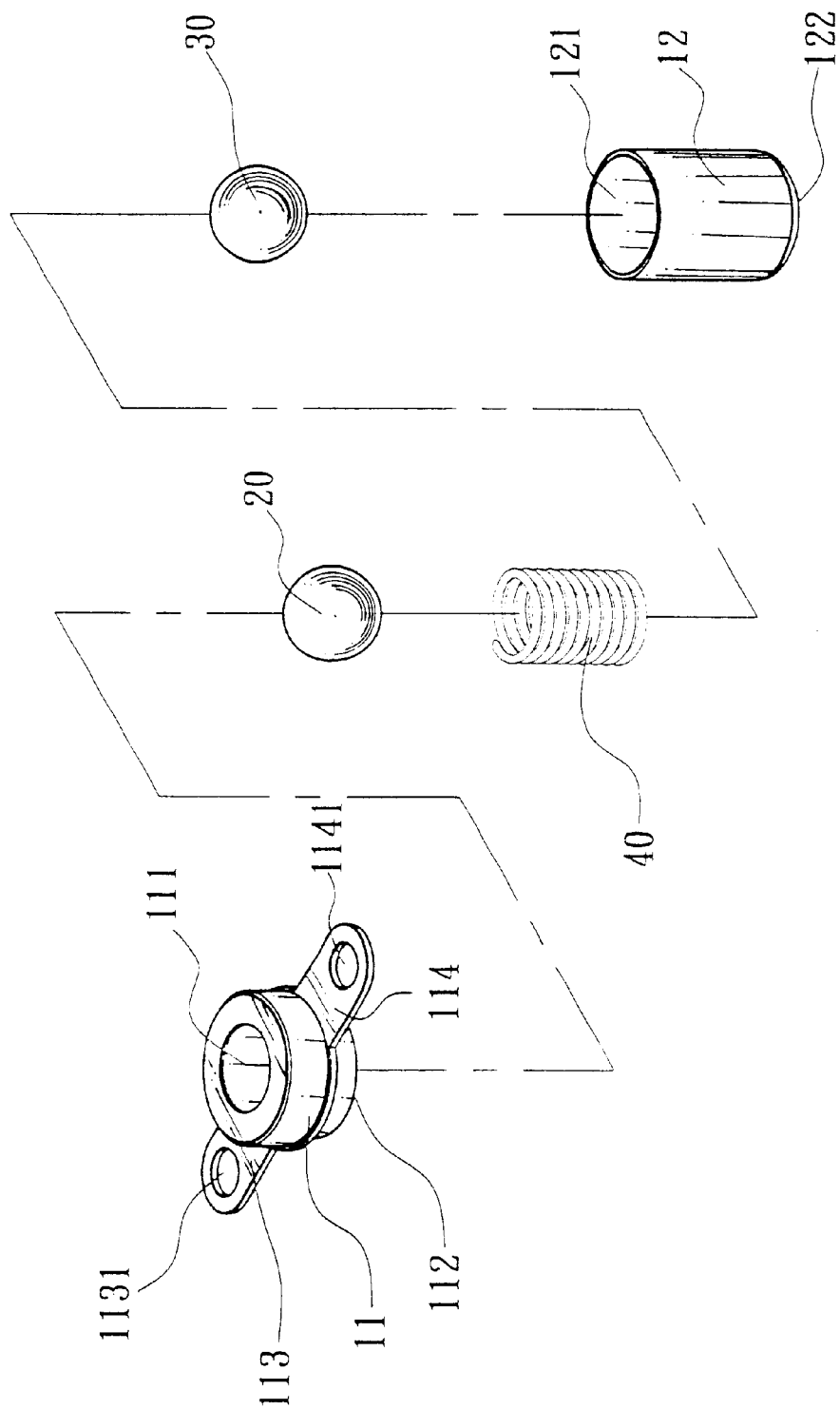
FIG. 1 is an exploded view of a sliding mechanism according to the invention.
Figure 2:
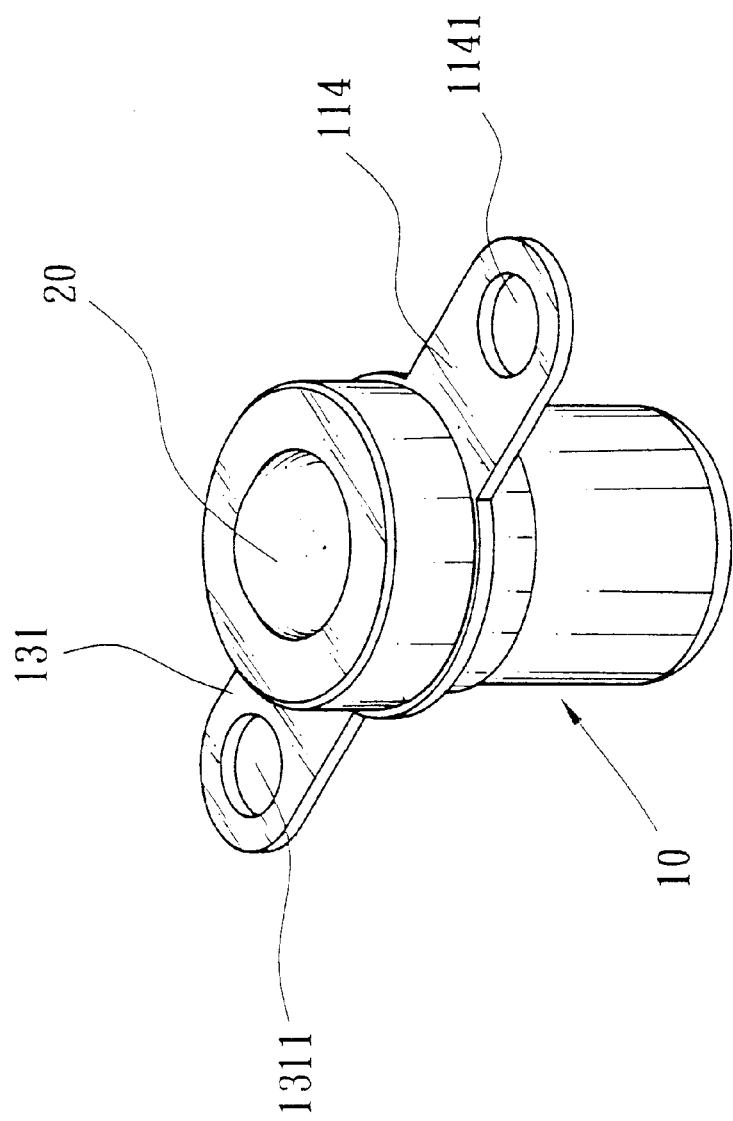
FIG. 2 is a perspective view of the assembled FIG. 1 sliding mechanism.
Figure 3:
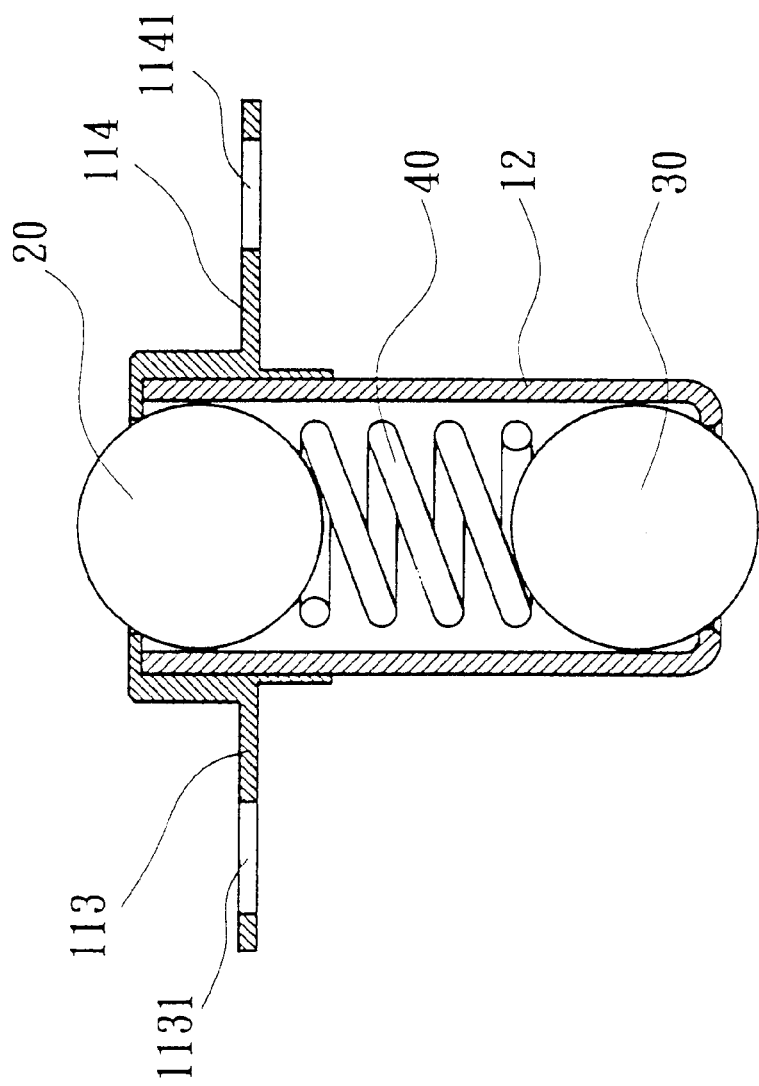
FIG. 3 is cross-sectional view of FIG. 2.

Referring to FIGS. 1 to 3, there is shown a sliding mechanism constructed in accordance with the invention comprising a sleeve member 10, two balls 20, 30 in the sleeve member 10, and an elastic member 40 in the sleeve member 10. Sleeve member 10 includes an upper hollow cylindrical cap 11 having an upper opening 111, a lower opening 112, and a pair of opposite horizontal wings 113, 114 each having a hole 1131 or 1141 and a sleeve 12 having an upper opening 121 and a lower opening 122. The outer diameter of sleeve 12 is about the same as the inner diameter of cap 11. As such, it is possible to put cap 11 on sleeve 12 to form the sleeve member 10. Each ball 20, 30 is made of metal. The diameter of each ball is smaller than the inner diameters of cap 11 and sleeve 12, while slightly larger than the bore of each of upper opening 111 of cap 11 and lower opening 122 of sleeve 12. As such, balls 20 and 30 may be received in sleeve member 10 while being prevented from dropping out of sleeve member 10 through upper opening 111 of cap 11 and lower opening 122 of sleeve 12 respectively. It is designed that about one fourth of ball is projected above either opening 111, 122. Elastic member 40 is a helical spring biased between the balls 20 and 30 for urging each ball 20, 30 to slightly project above either opening 111, 122 while permitting balls 20, 30 to rotate in sleeve member 10.

Figure 4A:
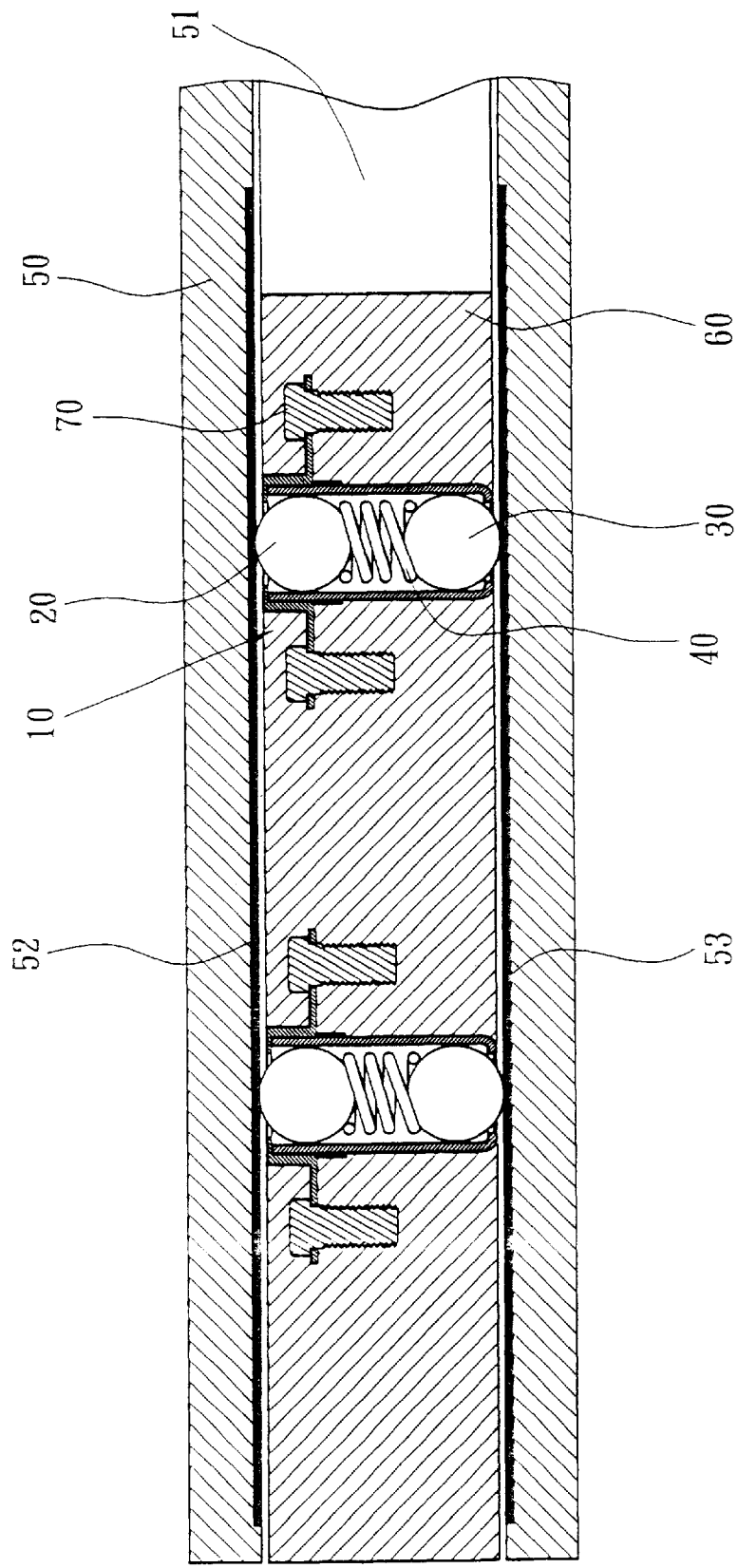
FIG. 4A is a cross-sectional view illustrating the sliding mechanism mounted on a second member which is received in a first member.
Figure 4B:
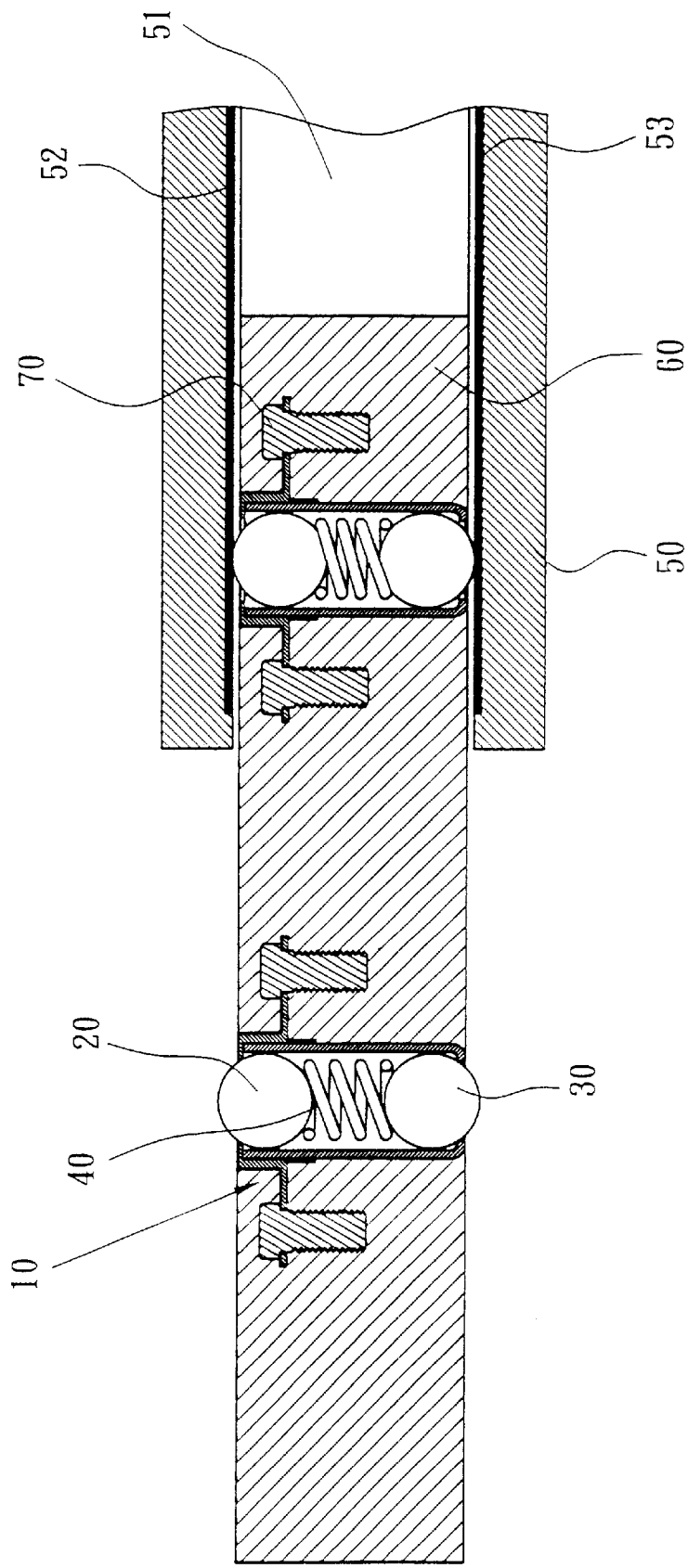
FIG. 4B is view similar to FIG. 4A where the second member partially pulled out of the first member.

Referring to FIGS. 4A and 4B, an operation of the sliding mechanism of the invention will now be described below. First member 50 (e.g., the computer body of a notebook computer) has a receiving space 51. Second member 60 (e.g., removable keyboard of notebook computer) is removably received in receiving space 51 of first member 50. It is designed that second member 60 may be totally received in receiving space 51 of first member 50 when not in use as shown in FIG. 4A or removed out of first member 50 when in use as shown in FIG. 4B. Sleeve member 10 is provided in the second member 60 wherein a screw 70 is driven through either hole 1131 of wing 113 or hole 1141 of wing 114 so as to secure sleeve member 10 to second member 60. The height of sleeve member 10 is about equal to the thickness of second member 60. As such, balls 20, 30 may be projected above the top and bottom surfaces of second member 60. It is possible to mount more than one sleeve member 10 (two are shown) in second member 60. The second member 60 is slidable with respect to the first member 50 with sleeve members 10 being in elastic contact with the inner surfaces of first member 50. A reduction of friction between the first and a second members 50 and 60 are effected because the first member 50 is simply in contact with second member 60 by a plurality of balls 20, 30. This may also reduce the friction therebetween for obtaining a smooth movement. Further, a permanent contact between the first and a second members 50, 60 is effected because balls 20, 30 are always biased against the inner surfaces of first member 50 by the expansion of elastic member 40. This may allow a small tolerance between first and second members 50 and 60.

Moreover, keyboard and computer are required to be electrically connected. As such, conductive metal contacts 52 and 53 may be provided on the top and bottom inner surfaces of first member 50 respectively. Conductive metal contacts 52, 53 are electrically connected to the circuitry of computer. Also, one of sleeve members 10 in second member 60 is electrically connected the circuitry of keyboard. As such, second member 60 may be electrically connected to first member 50 through sleeve member 10. Such electrical connection is secured because a small tolerance between first and second members 50 and 60 is allowable, as state above, since balls 20, 30 are always biased against the inner surfaces of first member 50 by the expansion of elastic member 40.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sliding mechanism mounted in a first member which is releasably secured to a second member, the sliding mechanism comprising:

a sleeve member;

two balls rotatably mounted in the sleeve member; and an elastic member biased between the balls for urging each ball to project above either opening of the sleeve member to contact the second member, wherein the sleeve member comprises an upper cap and a sleeve with the outer diameter smaller than the inner diameter of the cap so as to put the cap on the sleeve.

2. The sliding mechanism of claim 1, wherein each of the cap and the sleeve is a hollow cylindrical member having an upper opening and a lower opening.

3. The sliding mechanism of claim 2, wherein the diameter of each ball is smaller than the inner diameters of the cap and the sleeve, while larger than the bore of each of the upper opening of the cap and the lower opening of the sleeve.

4. The sliding mechanism of claim 1, wherein the cap further comprises a pair of opposite horizontal wings each having a hole.

5. The sliding mechanism of claim 4, wherein the wing is secured to the first member by driving a screw through its hole.

6. The sliding mechanism of claim 1, wherein each ball is formed of metal.

* * * * *